United States Patent [19]

Sagara et al.

[11] Patent Number: 4,532,555
[45] Date of Patent: Jul. 30, 1985

[54] VIDEO REPRODUCING APPARATUS

[75] Inventors: Kikuo Sagara; Masanori Kojima, both of Nagaokakyo, Japan

[73] Assignee: Mitsubishi Denki Kabushiki Kaisha, Tokyo, Japan

[21] Appl. No.: 438,509

[22] Filed: Nov. 2, 1982

[30] Foreign Application Priority Data

Feb. 13, 1982 [JP] Japan .................................. 57-23126

[51] Int. Cl.³ ...................... H04N 5/76; H04N 9/493; H04N 9/44
[52] U.S. Cl. ..................................... 358/310; 358/11; 358/148; 358/319
[58] Field of Search ................... 358/310, 319, 11, 17, 358/21 R, 148, 150

[56] References Cited

U.S. PATENT DOCUMENTS

4,314,273  2/1982  Amery .................................. 358/11
4,447,834  5/1984  Sugiyama ............................. 358/310

Primary Examiner—Robert L. Richardson
Attorney, Agent, or Firm—Lowe, King, Price & Becker

[57] ABSTRACT

A video reproducing apparatus adapted for reproducing a television signal of two or more television standard systems, comprising signal extracting means (3a, 3b) for extracting a video signal from a recording medium (1) for providing a reproduced signal (S1), a color signal processing means (11) for processing a color signal in the reproduced signal (S1) for adapting the same to the respective television standard systems, a color reference signal generating means (10) for generating a color reference signal (S6) of the frequency associated with each of the respective television standard systems, a frequency dividing means (8, 15) for frequency dividing the color reference signal (S6) for generating a vertical reference signal (S5) of the frequency associated with each of the television standard systems, and switches (SW1 to SW3) for selecting each of the respective television standard systems. The vertical reference signal (S5) is generated without providing a discrete oscillating circuit but rather by frequency dividing the color reference signal (S6). Accordingly, the number of components can be decreased and the frequency relation of both signals is maintained constant, whereby any undesired phenomenon is prevented from occurring.

9 Claims, 6 Drawing Figures

PRIOR ART

FIG. 5

VIDEO REPRODUCING APPARATUS

BACKGROUND OF THE INVENTION

1. Field of the Invention

The present invention relates to a video reproducing apparatus. More specifically, the present invention relates to a video reproducing apparatus adapted for reproducing a television signal of two or more television standard systems.

2. Description of the Prior Art

Major television standard systems currently adopted in the world comprise the NTSC system and the PAL system. According to the NTSC system, the three primary colors are transmitted after conversion thereof into a brightness signal $E_Y$ and two chroma signals $E_I$ and $E_Q$ rather than direct transmission of the three primary color signals and these chroma signals as well as the brightness signal are used to provide color demodulation on the part of a receiver. As a result, compatibility of color television broadcasting with monochrome television broadcasting can be established. According to the NTSC system, the color subcarrier frequency $f_S$ is selected to be 3.58 MHz (more correctly, 3.579545 MHz) and the vertical reference frequency $f_V$ is selected to be 59.94 Hz. On the other hand, according to the PAL system, one out of the two chroma signals $E_I$ and $E_Q$ of the NTSC system is subjected to phase inversion for every other scanning line in transmission of the signals. According to the PAL system, the color subcarrier frequency $f_S$ is selected to be 4.43 MHz (more correctly, 4.43361875 MHz) and the vertical reference frequency $f_V$ is selected to be 50.00 Hz.

On the other hand, a carrier chroma signal low frequency region converting and multiple recording system (simply referred to as M system) has been proposed and put into practical use as one of the systems for recording a video signal in a magnetic tape in a video tape recorder and in particular the M system has been widely used in a home use video tape recorders. According to the M system, in the case of a video tape recorder of the NTSC system, for example, a color signal of the color subcarrier frequency $f_S$ of 3.58 MHz is converted into a low regional frequency of 629 KHz while a brightness signal is subjected to FM modulation, whereupon both are multiplexed and recorded in a magnetic tape. On the occasion of reproduction, the low regional converted color subcarrier frequency $f_{SL}$ of 629 KHz is converted into the color subcarrier frequency $f_S$ of 3.58 MHz. In the case of a video tape recorder of the PAL system, the low regional converted color subcarrier frequency $f_{SL}$ is selected to be 627 KHz and the color subcarrier frequency $f_S$ is selected to be 4.43 MHz. As described in the foregoing, the color subcarrier frequencies of the NTSC system and the PAL system are largely different in that the former is 3.58 MHz and the latter is 4.43 MHz. Accordingly, it follows that connection of a video tape recorder of the NTSC system to a monitor television receiver for use in a region where the PAL system has been adopted as the television standard system does not provide normal operation, and similarly, an attempt at reproduction of a magnetic tape recorded in accordance with the NTSC system using a video tape recorder of the PAL system does not result in normal operation, and vice versa. A so-called 4.43 NTSC system has been proposed and put into practical use as one of the systems for solving the above described problems. The 4.43 NTSC system is adapted to make possible reproduction of a magnetic tape recorded in accordance with the NTSC system using a video tape recorder of the PAL system. To that end, the color subcarrier frequency $f_S$ of a composite video signal obtained from the video tape recorder is selected to be 4.43 MHz. Accordingly, with a video tape recorder adapted to be capable of reproducing both the NTSC system and the 4.43 NTSC system, a magnetic tape recorded in accordance with the NTSC system can be reproduced in both an area where the NTSC system has been adopted and an area where the PAL system has been adopted as the television standard system.

Figure 1:
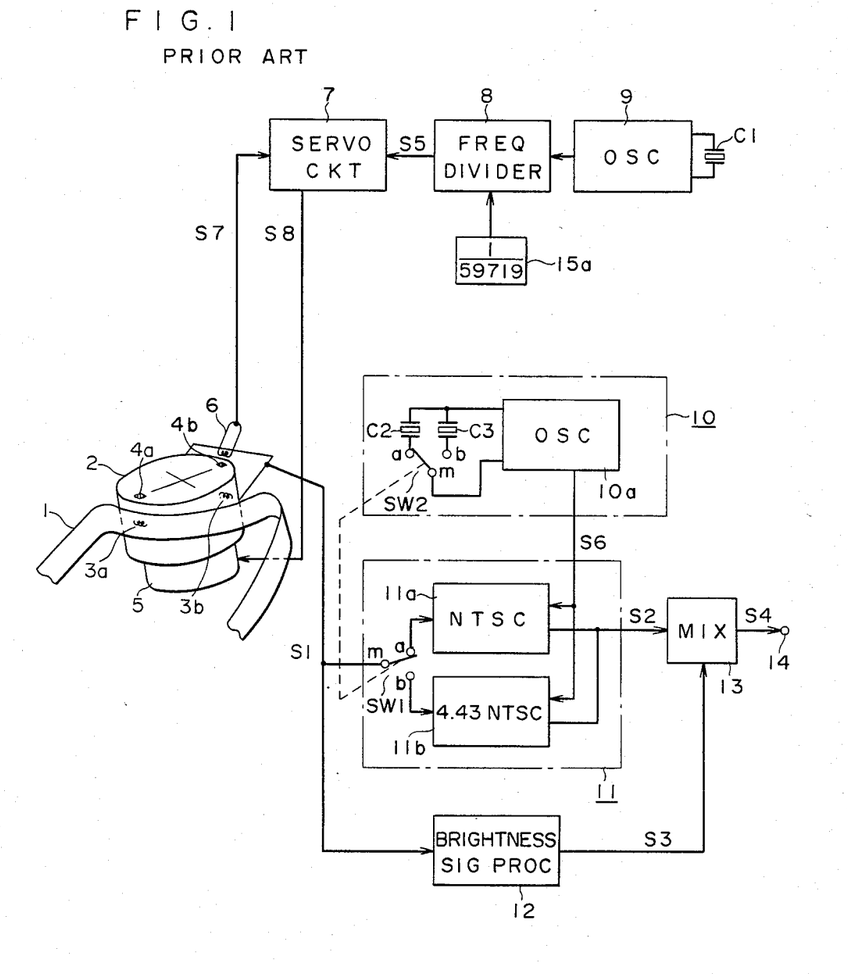
FIG. 1 is a block diagram of a conventional video tape recorder capable of reproducing both the television signals of the NTSC system and 4.43 NTSC system.

FIG. 1 is a block diagram showing a conventional video tape recorder adapted to be capable of operating according to both the NTSC system and the 4.43 NTSC system. Referring to FIG. 1, a magnetic tape 1 is adapted to travel around a rotational drum 2. The rotational drum 2 is provided with rotational heads 3a and 3b and magnets 4a and 4b. A fixed head 6 is provided at the position for detecting the magnets 4a and 4b. A motor 5 is mechanically coupled to the rotational drum 2. The output of the fixed head 6 is connected to one input of a servo circuit 7. The outputs of the rotational heads 3a and 3b are coupled through a rotary transformer, not shown, to a common contact m of a switch SW1 in a color signal processing circuit 11 and the input portion of the brightness signal processing circuit 12. A contact a of the switch SW1 is connected to one input of an NTSC color signal processing circuit 11a and a contact b of the switch SW1 is connected to one input of a 4.43 NTSC color signal processing circuit 11b. On the other hand, the output of an oscillating circuit 9 having a crystal resonator C1 coupled thereto is connected to an input of a frequency divider 8. Furthermore, a frequency division ratio setting circuit 15a is connected to the frequency divider 8. The output of the frequency divider 8 is connected to the other input of the servo circuit 7 and the output of the servo circuit 7 is connected to the motor 5. A color reference signal generating circuit 10 comprises an oscillating circuit 10a, which is adapted to be switchably connected to a crystal resonator C2 or C3 through a switch SW2. The output of the oscillating circuit 10a is connected to the other input of each of the NTSC color signal processing circuit 11a and the 4.43 NTSC color signal processing circuit 11b. The outputs of the NTSC color signal processing circuit 11a, the 4.43 NTSC color signal processing circuit 11b and the brightness signal processing circuit 12 are connected to the input of a mixing circuit 13 and the output of the mixing circuit 13 is connected to a terminal 14.

When the rotating drum 2 is rotated by the motor 5, the rotating heads 3a and 3b reproduce a video signal recorded on the magnetic tape 1 and a reproduced signal S1 is provided. The reproduced signal S1 comprises a color signal and a brightness signal. The fixed head 6 detects the positions of the magnets 4a and 4b, thereby to provide a pulse signal S7. On the other hand, the oscillation frequency of the crystal resonator C1 is selected to be 3.579545 MHz and the oscillating circuit 9 provides a signal of the above described frequency. The frequency divider 8 frequency divides the above described signal, thereby to provide a vertical reference signal S5 of the vertical reference frequency $f_V$ of 59.94 Hz. The frequency division ratio setting circuit 15 serves to set the frequency division ratio of the frequency divider 8 and the frequency division ratio in the above described case is selected to be 1/59719. The servo circuit 7 controls the rotation of the motor 5 such that the relative phase relation of the vertical reference signal S5 from the frequency divider 8 with the rotational heads 3a and 3b may be a constant value, i.e. synchronization of the pulse signal S7 from the fixed head 6 with the vertical reference signal S5 from the frequency divider 8 may be established. Meanwhile, the relative positional relation of the magnets 4a and 4b with the fixed head has been determined such that the pulse signal S7 is obtained from the fixed head 6 when the vertical synchronizing signal recorded at the bottom portion of the video signal track of the magnetic tape is detected by the rotation head 3a or 3b. The above described vertical reference frequency $f_V$ is 59.94 Hz for both of the NTSC system and the 4.43 NTSC system and the accuracy of 0.01 to 0.1% is required. Accordingly, the vertical reference signal S5 is usually obtained through frequency division of the output from the crystal oscillating circuit by means of the frequency divider, as described previously.

The oscillating circuit 10a is adapted to provide the color reference signal S6 from the crystal resonator C2 or C3 connected thereto. The frequency of the crystal resonator C2 is selected to be 3.579545 MHz and that of the crystal resonator C3 is selected to be 4.43361875 MHz. Selection between the crystal resonators C2 and C3 is performed by the switch SW2. The switch SW2 is a manual switch and is structured to be switchable in adaptation to the system of the video tape recorder. More specifically, in the case where it is desired that the video tape recorder operate in accordance with the NTSC system, the crystal resonator C2 is selected, whereas it is desired that the video tape recorder operate according to the 4.43 NTSC system, the crystal resonator C3 is selected. The reproduced signal S1 from the rotational heads 3a and 3b is switched by the switch SW1 and is applied to the NTSC color signal processing circuit 11a or the 4.43 NTSC color signal processing circuit 11b. The switch SW1 is also a manual switch and is adapted to be switchable in a ganged fashion with the switch SW2. More specifically, in the case where it is desired that the video tape recorder should operate according to the NTSC system, the NTSC color signal processing circuit 11a is selected, whereas in the case where it is desired that the video tape recorder should operate in accordance with the 4.43 NTSC system, the 4.43 NTSC color signal processing circuit 11b is selected. The NTSC color signal processing circuit 11a extracts only the color signal from the reproduced signal S1 and processes the color signal to convert the same to a color signal of the NTSC system based on the color reference signal S6 obtained from the oscillating circuit 10a. For example, the color signal of the low frequency region converted color subcarrier frequency $f_{SL}$ of 629 KHz is converted to a color signal of the color subcarrier frequency $f_S$ of 3.58 MHz. Likewise, the 4.43 NTSC color signal processing circuit 11b also extracts only the color signal from the reproduced signal S1 and processes the color signal to convert the same into a color signal of the 4.43 NTSC system. For example, the color signal of the low region converted color subcarrier frequency $f_{SL}$ of 627 KHz is converted into a color signal of the color subcarrier frequency $f_S$ of 4.43 MHz. In such a case, if the video tape recorder is to be monitored by connecting the same to an ordinary television receiver, the accuracy of 0.001% to 0.01% is required for the color subcarrier frequency $f_S$ and approximately the same precision is required for the color reference signal S6 obtained from the oscillating circuit 10a. Therefore, a crystal oscillating circuit is usually employed for the color reference signal generating circuit 10.

The brightness signal processing circuit 12 extracts only the FM modulated brightness signal and demodulate the same. The mixing circuit 13 serves to mix the color signal S2 from the NTSC color signal processing circuit 11a or the 4.43 NTSC color signal processing circuit 11b with the brightness signal S3 from the brightness signal processing circuit 12, thereby to provide a composite video signal S4 to the terminal 14. The composite video signal S4 is withdrawn directly or through an RF converter, not shown, to a monitor television receiver.

Figure 2:
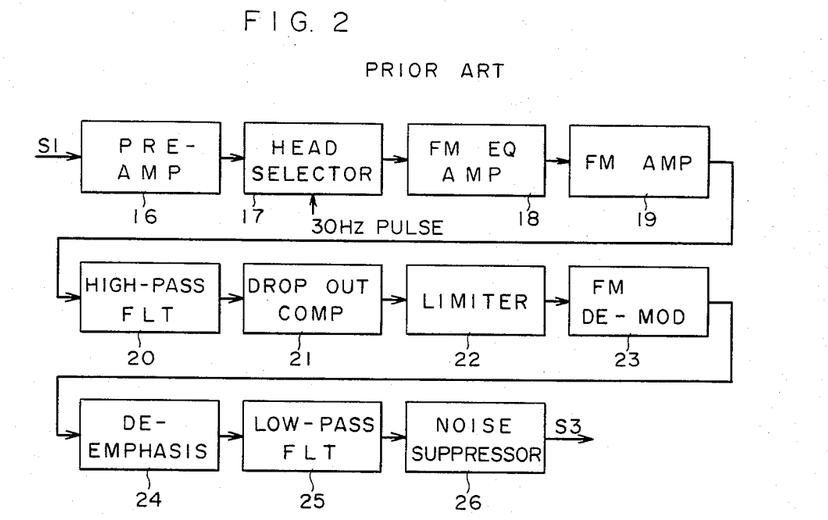
FIG. 2 is a block diagram of a brightness signal processing circuit.

Meanwhile, for better understanding of the background of the present invention, the servo circuit 7, the NTSC color signal processing circuit 11a and the brightness signal processing circuit 12 will be briefly described. FIG. 2 is a block diagram showing the brightness signal processing circuit. The reproduced signal S1 obtained from the rotational heads 3a and 3b is amplified by a preamplifying circuit 16 and is switched by a head selecting circuit 17 and the output therefrom is applied to an FM equalizing amplifying circuit 18. The signal undergoes correction of the frequency by the FM equalizing amplifying circuit 18 and is amplified by an FM amplifying circuit 19 and the output therefrom is applied to a high-pass filter 20. Only the frequency modulated brightness signal is withdrawn from the high-pass filter 20 and the output therefrom undergoes compensation for a missing signal by a dropout compensating circuit 21 and an amplitude varying component is removed by a limiter 22 and the output therefrom is demodulated by a frequency demodulator 23. The demodulated brightness signal undergoes attenuation of a high frequency region by a deemphasis circuit 24 and a frequency band for accomodating a color signal is secured by a low-pass filter 25, whereupon a noise component is removed therefrom by a noise suppressing circuit 26, whereby the output is obtained as a brightness signal S3.

Figure 3:
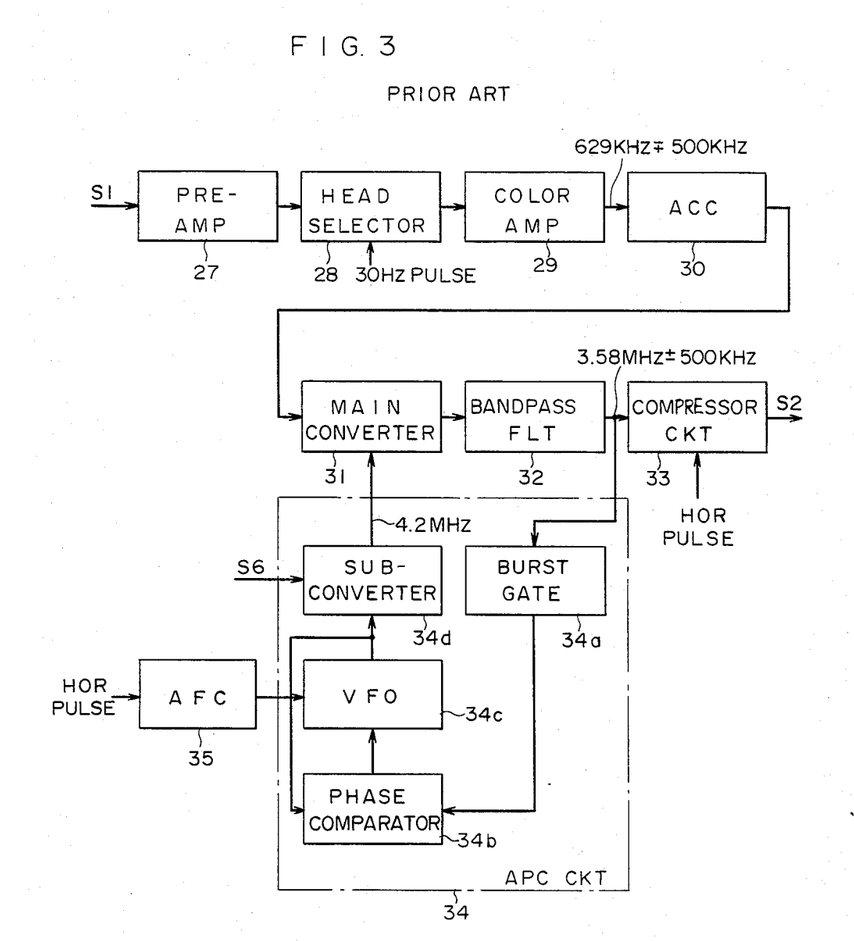
FIG. 3 is a block diagram of an NTSC color signal processing circuit.

FIG. 3 is a block diagram of the NTSC color signal processing circuit. The reproduced signal S1 is applied through a preamplifying circuit 27 and a head selecting circuit 28 to a color amplifying circuit 29. In actuality, the preamplifying circuit 27 and the head selecting circuit 28 are shared with the preamplifying circuit 16 and the head selecting circuit 17 shown in FIG. 2. Only a color signal of 629 KHz ±500 KHz is extracted and amplified by a low-pass filter in a color amplifying circuit 29. The above described color signal is converted into a signal of a constant magnitude by means of an automatic color control circuit 30 and is applied to a main converter 31, where the signal is frequency converted. A bandpass filter 32 extracts only a difference signal of 3.58 MHz ±500 KHz. A compressor circuit 33 attenuates by 6 dB the burst signal which was previously amplified by 6 dB on the occasion of recording, thereby to provide the color signal S2. An automatic phase control circuit 34 comprises a burst gate 34a, a phase comparator 36b, a variable frequency oscillating circuit 34c and a subconverter 34d and is supplied with the color reference signal S6, thereby to compensate for phase variation included in the reproduced signal S1 as wow, flutter or the like during the travel of the magnetic tape 1. An automatic frequency control circuit 35 also compensates for frequency variation included as wow, flutter and the like during the travel of the magnetic tape 1. The structure of the 4.43 NTSC color signal processing circuit 11b is the same as that shown in FIG. 3 and the signal of 5.06 MHz is obtained from the subconverter 34d, while the color signal of 4.43 MHz is obtained from the bandpass filter 32.

Figure 4:
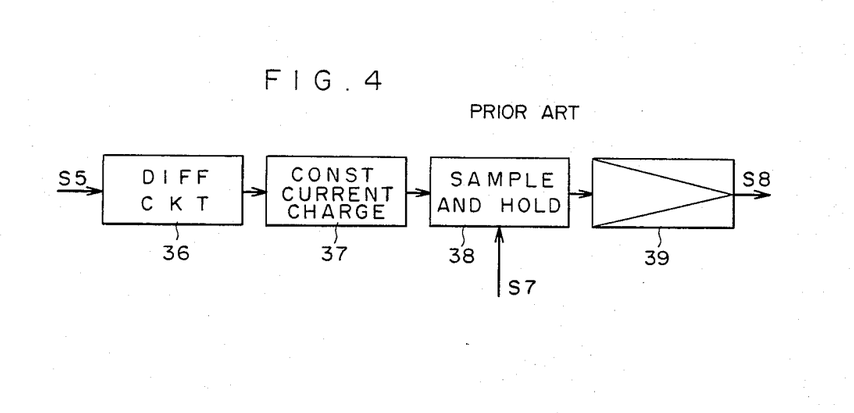
FIG. 4 is a block diagram of a servo circuit.

FIG. 4 is a block diagram of the servo circuit. The vertical reference signal S5 is differentiated by a differentiating circuit 36 and a constant current charging circuit 37 is responsive to the output from the differentiating circuit 36 to charge a capacitor included therein with a constant current. A sample/hold circuit 38 serves to sample/hold the output voltage from the constant current charging circuit 37 at the timing point when the pulse signal S7 is applied. For example, the more the phase of the pulse signal S7 is delayed as compared with the vertical reference signal S5, the higher the voltage obtained from the sample/hold circuit 38 becomes. The output from the sample/hold circuit 38 is amplified by an amplifier 39 and is withdrawn as a driving signal S8. Accordingly, synchronization of the vertical reference signal S5 with the pulse signal S7 is established.

As described in the foregoing, according to the conventional video tape recorder, the switches SW1 and SW2 are switched in association with the system to be reproduced, whereby either the NTSC system or the 4.43 NTSC system can be reproduced. However, the oscillating circuit 9 and the crystal resonator C1 for providing the vertical reference signal S5 and the NTSC color signal processing circuit 10a and the crystal resonators C2 and C3 for providing the color reference signal S6 are separately provided, which increases the number of the components and accordingly increases the number of manufacturing steps and in addition reduces reliability and economy in cost. Furthermore, since the NTSC system employs frequency interleaving in which the sidebands of the color signal are accurately interleaved between the sidebands of the brightness signal, it is required that the frequency of the vertical reference signal S5 has an accurate predetermined relation with the frequency of the color reference signal S6. Therefore, conventionally it has been necessary to make fine adjustment of the frequencies of both the oscillating circuit 9 and the oscillating circuit 10a, which requires some manual work. Thus, it has been desired that a video tape recorder is provided in which the number of components can be reduced and manual work for adjustment can be dispensed with.

SUMMARY OF THE INVENTION

In summary, the present invention comprises a video reproducing apparatus adapted for reproducing a television signal of two or more television standard systems, which comprises extracting means for extracting a video signal recorded in a recorded medium for providing a reproduced signal, color signal processing means coupled to the extracting means for processing a color signal in the reproduced signal so as to be in accord with the respective television standard systems, color reference signal generating means coupled to the color signal processing means for generating a color reference signal of the frequency associated with the respective television standard systems, and frequency dividing means coupled to the color reference signal generating means for frequency dividing the color reference signal for providing a vertical reference signal of the frequency associated with the respective television standard systems.

According to the present invention, a color reference signal of the frequency associated with the respective television standard systems is provided from the color reference signal generating means. The color signal processing means is responsive to the color reference signal to process the color signal reproduced from the recording medium to be in accord with the respective television standard systems. The frequency dividing means serves to frequency divide the color reference signal to provide a vertical reference signal of the frequency associated with the respective television standard systems. Thus, according to the present invention, reproduction of a television signal of two or more television standard systems can be made. In such case, the vertical reference signal can be provided by simply frequency dividing the color reference signal rather than employing a separate oscillating circuit. Accordingly, the number of components can be decreased and a frequency relation between the color reference signal and the vertical reference signal can be maintained constant, which simplifies frequency adjustment and can prevent unfavorable phenomena such as noise from appearing on the screen of a monitor television receiver.

Accordingly, a principal object of the present invention is to provide a video reproducing apparatus adapted for reproducing a television signal of two or more television standard systems, wherein the number of components can be decreased and an accurate predetermined relation can be established between the frequency of a color reference signal and that of a vertical reference signal.

An advantage of the present invention is that a separate oscillating circuit need not be provided for generating a vertical reference signal, the number of components and the number of manufacturing steps can be reduced, while reliability and economy can be enhanced.

Another advantage of the present invention is that since an accurate predetermined relation can be maintained between the frequency of a color reference signal and that of a vertical reference signal a dot-like noise or a vertical stripe due to a subcarrier can be prevented from appearing on the screen of a monitor television receiver.

A further advantage of the present invention is that manual work is not required for adjustment of a relation between the frequency of a color reference signal and that of a vertical reference signal.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 5:
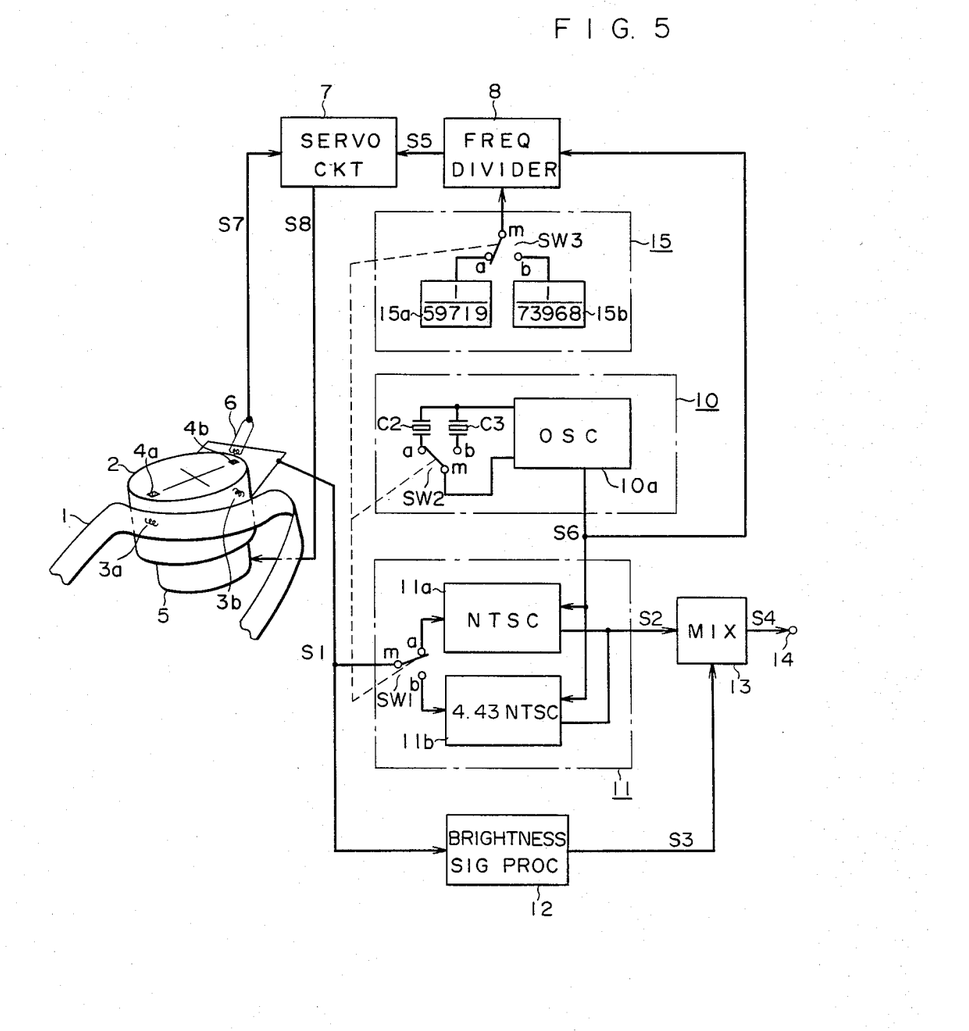
FIG. 5 is a block diagram of one embodiment of the present invention.

FIG. 5 is a block diagram of one embodiment of the present invention. Now a description will be mainly made of a difference of the present invention from the FIG. 1 conventional video tape recorder. According to the embodiment shown, the oscillating circuit 9 and the crystal resonator C1 shown in FIG. 1 are omitted and instead the output of the oscillating circuit 10a is connected to the input of the frequency divider 8. In addition, the frequency divider 8 is coupled to a frequency division ratio setting circuit 15 including frequency division ratio setters 15a and 15b and a switch SW3 so that either the frequency division ratio setter 15a or the 15b is selectively connected by the switch SW3. The SW3 may comprise a manual switch and is adapted to be switchable in a ganged fashion with the previously described switches SW1 and SW2. More specifically, in the case where it is desired that the video tape recorder is of the NTSC system, the frequency division ratio setter 15a is selected, whereas in the case where it is desired that the video tape recorder operate in the 4.43 NTSC system the frequency division ratio setter 15b is selected. The frequency division ratio of the frequency division ratio setter 15a is selected to be 1/59719, whereas the frequency division ratio of the frequency division ratio setter 15b is selected to be 1/73968. The frequency divider 8 serves to frequency divide the applied signal in accordance with either of these frequency division ratios.

Now assuming that the NTSC system is selected, the crystal resonator C2 is selected in the color reference signal generating circuit 10 and the NTSC color signal processing circuit 11a is selected in the color signal processing circuit 11, while the frequency division ratio setter 15a is selected in the frequency division ratio setting circuit 15. Accordingly, the color reference signal S6 of 3.579545 MHz is obtained from the color reference signal generating circuit 10 and the signal is then frequency divided by 1/59719 by means of the frequency divider 8, thereby to provide the vertical reference signal S5 of 59.94 Hz. Furthermore, as described previously, the color signal of the low frequency region converted color subcarrier frequency $f_{SL}$ of 629 KHz is converted into the color signal of the color subcarrier frequency of $f_S$ of 3.58 MHz. Conversely, in the case where the 4.43 NTSC system is selected, the crystal resonator C3 is selected in the color reference signal generating circuit 10 and the 4.43 NTSC color signal processing circuit 11b is selected in the color signal processing circuit 11, while the frequency division ratio setter 15b is selected in the frequency division ratio setting circuit 15. Accordingly, the color reference signal S6 of 4.43361875 MHz is obtained from the color reference signal generating circuit 10 and the signal is then frequency divided by 1/73968 by means of the frequency divider 8, thereby to provide the vertical reference signal S5 of 59.94 Hz. Furthermore, as described previously, in the 4.43 NTSC color signal processing circuit the color signal of the low frequency region converted color subcarrier frequency $f_{SL}$ of 629 KHz is converted into the color signal of the color subcarrier frequency $f_S$ of 4.43 MHz.

Thus, according to the present invention, the oscillating circuit 9 and the crystal resonator C1 shown in FIG. 1 can be dispensed with. Accordingly, the number of components and the number of manufacturing steps can be decreased, while reliability and economy in cost can be enhanced. Furthermore, since a relation between the frequency of the vertical reference signal S5 and that of the color reference signal S6 remains unchanged inasmuch as the same is primarily determined by the frequency division ratio of the frequency division ratio setting circuit 15, the frequency of the vertical reference signal S5 can be determined with high accuracy by simply making fine adjustment of the frequency by means of the oscillating circuit 10a. Therefore, any manual work for fine adjustment of the frequency can be dispensed with and a dot-like noise, a vertical stripe and the like can be prevented from appearing on the screen of a monitor television receiver due to deviation of the predetermined relation between the frequency of the vertical reference signal S5 and that of the color reference signal S6.

Meanwhile, the television standard system may be the PAL-M system and the PAL-N system which are modifications of the previously described PAL system. The PAL-M system is a modification of the PAL system in which the scanning system is a 525/60 system and which was employed in Brazil in 1969. The PAL-N system is also a modification of the PAL system employing demodulation adapted to be responsive to quicker phase fluctuation, wherein the color subcarrier is adapted to make phase shift following a phase distortion to make it difficult to cause not only a hue error but also a saturation error. The color subcarrier frequency $f_S$ and the vertical reference frequency $f_V$ of the NTSC system, the 4.43 NTSC system, the PAL system, the PAL-M system and the PAL-N system are enumerated in the table. A video tape recorder adapted to be able to reproduce any of the above described systems could be used in any territories in the world adopting such systems and is particularly advantageous due to its compatibility. Such embodiment of the present invention will be described in the following.

TABLE

|  |  | Color Subcarrier Frequency $f_S$ (MHz) | Vertical Reference Frequency $f_V$ (Hz) |
|---|---|---|---|
| a. | NTSC | 3.579545 | 59.94 |
| b. | 4.43 NTSC | 4.43361875 | 59.94 |
| c. | PAL | 4.43361875 | 50.00 |
| d. | PAL-M | 3.57561149 | 59.94 |
| e. | PAL-N | 3.5820625 | 50.00 |

Figure 6:
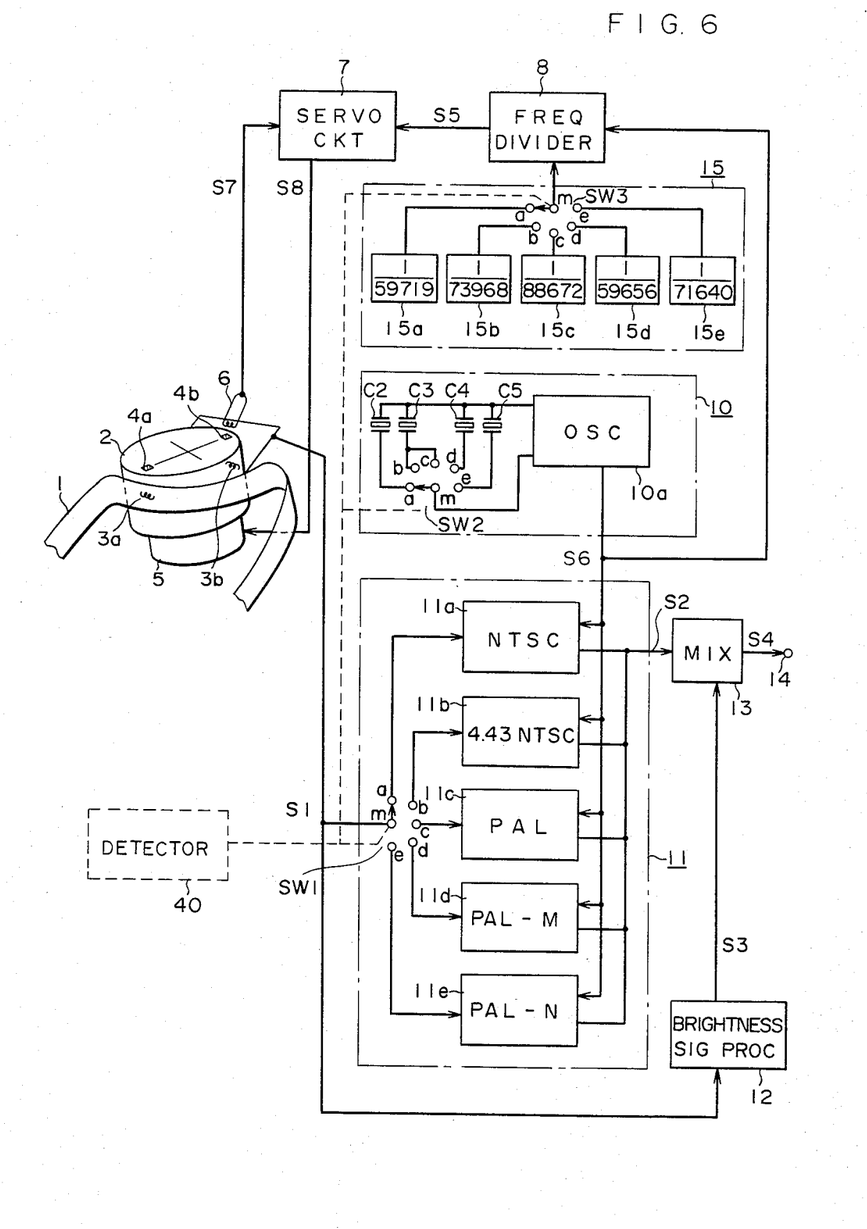
FIG. 6 is a block diagram of another embodiment of the present invention.

FIG. 6 is a block diagram of such other embodiment of the present invention. A description will be mainly made of a major difference of the other embodiment from the previously described FIG. 5 embodiment. In the color reference signal generating circuit 10, the crystal resonator C2 of the frequency of 3.579545 MHz is connected to the contact a of the switch SW2, the crystal resonator C3 of the frequency of 4.43361875 MHz is connected to the contacts b and c, and the crystal resonators C4 and C5 of the frequencies of 3.57561149 MHz and 3.5820625 MHz, respectively, are connected to the contacts d and e, respectively. In the color signal processing circuit 11, the NTSC color signal processing circuit 11a, the 4.43 NTSC color signal processing circuit 11b, the PAL color signal processing circuit 11c, the PAL-M color signal processing circuit 11d and the PAL-N color signal processing circuit 11e are connected to the contacts a, b, c, d and e, respectively, of the switch SW1. The PAL color signal processing circuit 11c, the PAL-M color signal processing circuit 11d and the PAL-N color signal processing circuit 11e are also adapted to process the reproduced signal S1 based on the color reference signal S6 to convert the same to those of the PAL system, the PAL-M system, and the PAL-N system. In the frequency division ratio setting circuit 15, the frequency division ratio setter 15a of the frequency division ratio of 1/59719, the frequency division ratio setter 15b of the frequency division ratio of the 1/73968, the frequency division ratio setter 15c of the frequency division ratio of 1/88672, the frequency division ratio setter 15d of the frequency division ratio of 1/59656, and the frequency division ratio setter 15e of the frequency division ratio of 1/71640 are connected to the contacts a, b, c, d and e, respectively, of the switch SW3. The switches SW1, SW2 and SW3 are provided in a ganged fashion, wherein the common contacts m of the respective switches are turned to the contacts of the same reference characters. Accordingly, the vertical reference signal S5 of the frequency of 59.94 Hz or 50.00 Hz is obtained from the frequency divider 8 in accordance with the selected system. Even in the case of the PAL system a vertical stripe appears on the television screen when the relation between the frequency of the vertical reference signal S5 and that of the color reference signal S6 deviates. However, according to the above described embodiment, such frequency relation is prevented from deviating, as described previously.

Meanwhile, the above described brightness signal processing circuit 12 may be basically of the same circuit configuration irrespective of the different systems. However, the frequency characteristic of the input and output and the frequency characteristic of the deemphasis may be arbitrarily selected for each of the respective systems. Furthermore, although in the foregoing description selection of the switches SW1, SW2 and SW3 was described as being made manually, it may be adapted such that automatic selection may be made of the switches SW1, SW2 and SW3 in response to automatic determination of the recording system of the magnetic tape, by means of an automatic determining means 40, as shown by a dotted line in FIG. 6.

Although the embodiments of the present invention were described in the foregoing as embodied in a video tape recorder, the present invention is not limited thereto and the present invention can be equally applied to a video disc reproducing apparatus and an electronic video recorder employing a vertical reference signal and a color reference signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video reproducing apparatus adapted for reproducing a television signal of two or more television standard systems, each having a predetermined color subcarrier frequency and a predetermined vertical reference frequency, at least one of said predetermined color subcarrier frequency and said predetermined vertical reference frequency being different among said television standard systems, said video reproducing apparatus comprising:
    extracting means for extracting a video signal recorded in a recording medium for providing a reproduced signal,
    color signal processing means coupled to said extracting means for processing a color signal in said reproduced signal to be in accord with the respective television standard systems,
    color reference signal generating means coupled to said color signal processing means for providing a color reference signal of the frequency associated with the respective television standard systems, and
    frequency dividing means coupled to said color reference signal generating means for frequency dividing said color reference signal for generating a vertical reference signal of the frequency associated with the respective television standard systems.

2. A video reproducing apparatus in accordance with claim 1, wherein
    said color signal processing means comprises
        two or more color signal processing circuits for processing said color signal to be in accord with said different television standard systems, and
        first switch means for selectively connecting said color signal to said color signal processing circuits;
    said color reference signal generating means comprises
        a single oscillating circuit,
        two or more crystal resonators having different frequencies, and
        second switch means for selectively connecting said crystal resonators to said oscillating circuit; and
    said frequency dividing means comprises
        a single frequency divider,
        two or more frequency division ratio setters for setting the frequency division ratios of said frequency divider to have different frequency division ratios, and
        third switch means for selectively connecting said frequency division ratio setters to said frequency divider,
    said first, second and third switch means being adapted to be switchable to be adaptable to the respective television standard systems.

3. A video reproducing apparatus in accordance with claim 2, wherein
    said first, second and third switch means are adapted to be switchable in a ganged fashion.

4. A video reproducing apparatus in accordance with claim 3, which further comprises
    detecting means for automatically detecting the recording system of the recording medium, and wherein
    said first, second and third switching means are adapted to be switchable in response to said detecting means.

5. A video reproducing apparatus in accordance with claim 1 which further comprises
    driving means for mechanically driving said extracting means,
    position detecting means for detecting the position of said extracting means for providing a position signal, servo means coupled to said driving means, said position detecting means and said frequency dividing means and responsive to said position signal and said vertical reference signal for controlling a relative phase of said vertical reference signal and said extracting means to be a constant value, brightness signal processing means coupled to said extracting means for processing a brightness signal in said reproduced signal to be in accord with the respective television standard systems, and mixing means coupled to said color signal processing means and said brightness signal processing means for mixing said color signal from said color signal processing means and said brightness signal from said brightness signal processing means for providing a composite video signal.

6. In a video reproducing apparatus adapted for reproducing a television signal of two or more television standard systems, each having a predetermined color subcarrier frequency and a predetermined vertical reference frequency, at least one of said predetermined color subcarrier frequency and said predetermined vertical reference frequency being different among said television standard systems, said video reproducing apparatus including:

extracting means for extracting a video signal recorded in a recording medium for providing a reproduced signal, color signal processing means coupled to said extracting means for processing a color signal in said reproduced signal to be in accord with the respective television standard systems, color reference signal generating means coupled to said color signal processing means for providing a color reference signal of the frequency associated with the respective television standard systems, and vertical reference signal generating means for providing a vertical reference signal at a frequency having a predetermined relationship to the frequency of said color reference signal, the improvement comprising:

means connecting an output of said color reference signal generating means to said vertical reference signal generating means, for providing a signal having the frequency of said color reference signal to said vertical reference signal generating means, and frequency dividing means within said vertical reference signal generating means for dividing the frequency of said color reference signal to generate said vertical reference signal at a frequency associated with the respective television standard system.

7. An improved video reproducing apparatus as recited in claim 6 wherein said frequency dividing means includes a plurality of frequency division ratio setting circuits, and first selecting means for connecting an appropriate one of said plurality of frequency division ratio setting circuits to said frequency dividing means for selecting an appropriate frequency division ratio for amplification to the frequency of said color reference signal.

8. An improved video reproducing apparatus as recited in claim 7 wherein said color reference signal generating means includes more than two crystal resonator means associated therewith for providing reference frequencies associated with said two or more television standard systems, and second selecting means for selecting among said plural crystal resonating means to provide a reference frequency associated with the respective television standard systems.

9. An improved video reproducing apparatus as recited in claim 8 wherein said selecting means and said first selecting means are arranged for joint operation for jointly selecting appropriate reference frequencies and frequency division ratios associated with the respective television standard systems.

* * * * *